(12) United States Patent  
Eichen et al.

(10) Patent No.: US 9,338,093 B2  
(45) Date of Patent: May 10, 2016

(54) MOBILE PHONE DOCKING STATION VPNS

(71) Applicant: Verizon Patent and Licensing Inc., Arlington, VA (US)

(72) Inventors: Elliot G. Eichen, Arlington, MA (US); Gowtham Javaregowda, Waltham, MA (US); Lee N. Goodman; James Flynn, Stoughton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/519,522

(22) Filed: Oct. 21, 2014

(65) Prior Publication Data

US 2015/0036641 A1    Feb. 5, 2015

Related U.S. Application Data

(60) Division of application No. 13/047,011, filed on Mar. 14, 2011, now Pat. No. 8,879,420, which is a continuation-in-part of application No. 12/971,409, filed on Dec. 17, 2010, now Pat. No. 9,143,359.

(51) Int. Cl.

| | |
|---|---|
| *H04L 12/28* | (2006.01) |
| *H04L 12/741* | (2013.01) |
| *H04L 12/46* | (2006.01) |
| *H04W 4/00* | (2009.01) |
| *G06F 1/16* | (2006.01) |
| *H04M 7/00* | (2006.01) |

(52) U.S. Cl.
CPC .............. *H04L 45/74* (2013.01); *G06F 1/1632* (2013.01); *H04L 12/4633* (2013.01); *H04L 12/4641* (2013.01); *H04M 7/0075* (2013.01); *H04W 4/008* (2013.01)

(58) Field of Classification Search
None
See application file for complete search history.

(56) References Cited

U.S. PATENT DOCUMENTS

| | | |
|---|---|---|
| 6,148,074 A | 11/2000 | Miloslavsky et al. |
| 6,327,470 B1 | 12/2001 | Ostling |
| 7,107,360 B1 | 9/2006 | Phadnis et al. |
| 7,110,789 B1 | 9/2006 | Curtiss et al. |
| 7,120,241 B1 | 10/2006 | Fuoss et al. |
| 7,143,198 B2 | 11/2006 | Lee et al. |
| 7,400,886 B2 | 7/2008 | Sahim et al. |
| 2003/0039242 A1 | 2/2003 | Moore |
| 2003/0120821 A1* | 6/2003 | Thermond .............. H04L 63/10 709/250 |
| 2004/0122651 A1 | 6/2004 | Herle |
| 2004/0128554 A1 | 7/2004 | Maher et al. |
| 2005/0013103 A1 | 1/2005 | Chandley |
| 2005/0025129 A1 | 2/2005 | Meier |
| 2005/0090271 A1 | 4/2005 | Sylvain |
| 2005/0186960 A1 | 8/2005 | Jiang |

(Continued)

*Primary Examiner* — Nicholas Sloms

(57) ABSTRACT

A device includes a memory that stores multiple different types of applications and a data table, and a processing unit. The processing unit is configured to receive configuration data that sets up multiple network interfaces on the device, and assigns one of multiple different network addresses to each of the multiple network interfaces, store the configuration data in the data table, execute a first type of application of the multiple different types of applications, receive one or more first packets from executing the first type of application of the multiple different types of applications, retrieve a first Virtual Private Network (VPN) identifier associated with a first VPN from the data table based on the first type of application of the multiple different types of applications, and send the one or more first packets via the first VPN identified by the first VPN identifier.

20 Claims, 15 Drawing Sheets

(56) References Cited

U.S. PATENT DOCUMENTS

| | | |
|---|---|---|
| 2005/0227666 A1 | 10/2005 | Cheng |
| 2006/0120329 A1 | 6/2006 | Kim et al. |
| 2006/0187900 A1 | 8/2006 | Akbar |
| 2006/0229101 A1 | 10/2006 | LaBauve et al. |
| 2006/0242305 A1 | 10/2006 | Alnas |
| 2007/0189264 A1 | 8/2007 | Liu |
| 2008/0056472 A1 | 3/2008 | Tanemura et al. |
| 2008/0139222 A1 | 6/2008 | Falvo et al. |
| 2008/0151875 A1 | 6/2008 | Lim |
| 2008/0278894 A1 | 11/2008 | Chen et al. |
| 2009/0001173 A1 | 1/2009 | Sevier et al. |
| 2009/0022301 A1 | 1/2009 | Mudaliar |
| 2009/0023442 A1 | 1/2009 | Ahmed et al. |
| 2009/0059907 A1* | 3/2009 | Sindhwani .......... H04L 65/1036 370/354 |
| 2009/0097492 A1* | 4/2009 | Monette .............. H04L 12/4658 370/401 |
| 2009/0097629 A1 | 4/2009 | Huslak et al. |
| 2009/0163139 A1 | 6/2009 | Wright-Riley |
| 2009/0305683 A1 | 12/2009 | Gupta et al. |
| 2010/0074247 A1 | 3/2010 | Clark et al. |
| 2010/0130169 A1 | 5/2010 | Narayanaswamy et al. |
| 2010/0157990 A1 | 6/2010 | Krzyzanowski et al. |
| 2010/0250818 A1 | 9/2010 | Gill et al. |
| 2011/0040858 A1 | 2/2011 | Gum |
| 2011/0053643 A1 | 3/2011 | Shmunis |
| 2011/0098087 A1 | 4/2011 | Tseng |
| 2011/0206052 A1 | 8/2011 | Tan et al. |
| 2011/0287820 A1 | 11/2011 | Harrison et al. |
| 2012/0057565 A1 | 3/2012 | Mani |
| 2012/0099566 A1 | 4/2012 | Laine et al. |
| 2012/0303476 A1 | 11/2012 | Krzyzanowski et al. |

\* cited by examiner

| CONFIGURATION TABLE 800 → | DEVICE ID 810 | APP TYPE 815 | IP ADDRESS 820 | ACTUAL NETWORK 825 | VPN ID 830 | SECURITY CREDENTIALS 835 |
|---|---|---|---|---|---|---|
| | Device_ID_1 | App_type_1 | aaa.bbb.ccc.ddd | Wired_LAN_1 | default | -- |
| ENTRIES 805 | Device_ID_1 | App_type_2 | aaa.bbb.ccc.aaa | Wired_LAN_1 | VPN_1 | secure_cred_1_part_1/ secure_cred_1_part_2 |
| | Device_ID_1 | App_type_3 | aaa.bbb.ccc.bbb | Wireless_LAN_1 | VPN_2 | secure_cred_2_part_1/ secure_cred_2_part_2 |
| | Device_ID_2 | App_type_1 | aaa.bbb.ccc.ddd | Wired_LAN_1 | default | -- |

FIG. 8

MOBILE PHONE DOCKING STATION VPNS

RELATED APPLICATION

The present application is a divisional of U.S. application Ser. No. 13/047,011, entitled "Mobile Phone Docking Station VPNs" and filed Mar. 14, 2011; which is itself a continuation-in-part (CIP) of U.S. application Ser. No. 12/971,409, entitled "Mobile Phone Docking Station for VoIP" and filed Dec. 17, 2010; the disclosures of which are incorporated by reference herein in their entireties.

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

BRIEF DESCRIPTION OF THE DRAWINGS

FIG. 8 is a diagram that illustrates an exemplary configuration table that may be stored at the docking station of FIG. 1A;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a docking station, having VoIP telephone capabilities, may permit a mobile device, such as, for example, a cellular telephone, to be docked with the docking station. While docked with the docking station, the mobile device may conduct VoIP calls via a wired LAN/WAN connected to the docking station. The docking station may set up multiple Virtual Private Networks (VPNs) on one or more actual networks, and may also assign one or more of the VPNs to certain ones of multiple network addresses (e.g., IP addresses) used for routing traffic to/from the mobile device. The docking station may additionally map multiple different application types of client applications that may be installed on the mobile device to ones of the multiple network addresses. The docking station may provide configuration information to the mobile device that specifies a network address, actual network, and a VPN identifier for each type of application. The types of client applications may include, for example, VoIP applications, email applications, web browsing applications, or instant messaging (IM) applications. The mobile device may use the provided configuration information to send traffic via a specific actual network and a specific VPN based on the application type of the client application generating the traffic at the mobile device.

Figure 1A:
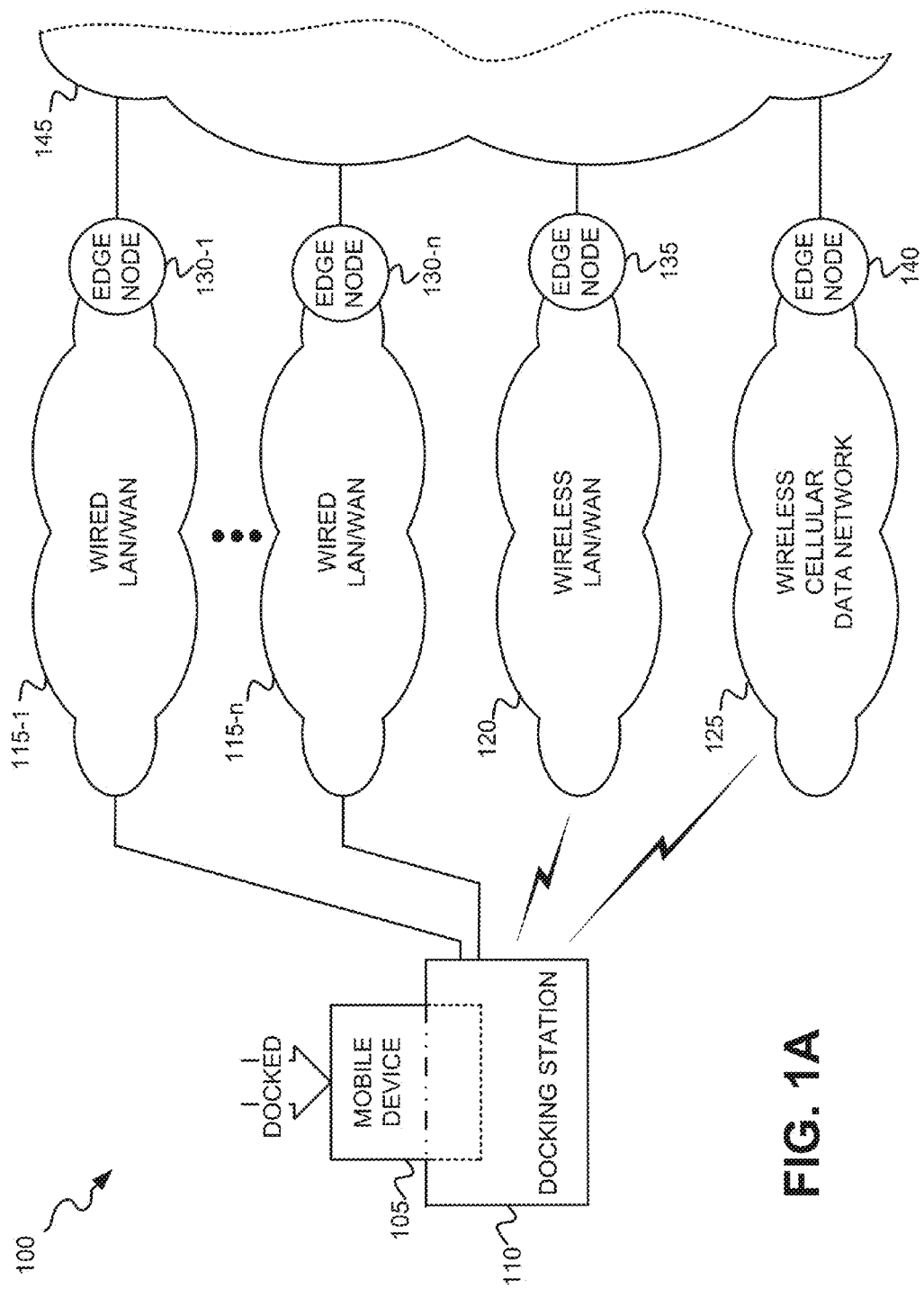
FIG. 1A is a diagram that depicts an exemplary network environment in which a mobile device, docked into a docking station, may send or receive data traffic over one or more multiple different networks.

FIG. 1A is a diagram that depicts an exemplary network environment 100 in which a mobile device 105, docked into a docking station 110, may send or receive data traffic over one or more of multiple different actual networks. As shown in FIG. 1A, mobile device 105, either directly or via docking station 110, may have a connection to multiple different local area networks (LANs)/wide area networks (WANs) 115-1 through 115-n, a wireless LAN/WAN 120, or a wireless cellular data network 125. Each of LANs/WANs 115-1 through 115-n, wireless LAN/WAN 120 and wireless cellular data network 125 may connect to a respective edge node 130-1 through 130-n, 135, or 140. Each of edge nodes 130-1 through 130-n, 135, or 140 may, in turn, connect to another network 145 (e.g., to a VOIP network). A single network 145 is shown in FIG. 1A for purposes of simplicity. In actuality, however, edge nodes 130-1 through 130-n, 135, and 140 may connect to multiple different networks 145.

Wired LANs/WANs 115-1 through 115-n may each include a corporate LAN/WAN, and/or other type of LAN/WAN (e.g., a home office LAN/WAN), that may include an Ethernet or IP network. Wireless LAN/WAN 120 may include a corporate wireless LAN/WAN and/or other type of wireless LAN/WAN (e.g., a home office wireless network). Wireless cellular data network 125 may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs) that includes a packet-switched network, such as, for example, General Packet Radio Service (GPRS), Cellular Digital Packet Data (CDPD), or Mobile IP networks. Network(s) 145 may include one or more networks that implement Ethernet protocol or Internet Protocol (IP) and which may carry VoIP traffic. Network(s) 145 may include one or more telecommunications networks (e.g., Public Switched Telephone Networks (PSTNs)), LANs, WANs, metropolitan area networks (MANs), an intranet, the Internet, or a cable network (e.g., an optical cable network).

Docking station 110 may include a VOIP phone that has a wired connection to a wired LAN/WAN 115 and which also has a docking port that permits mobile device 105 to be "docked" with docking station 110. Mobile device 105 may include, for example, a cellular telephone (e.g., a smart phone), a tablet computer, a personal digital assistant (PDA), or other type of digital computing device that has the capability to communicate via multiple different types of network connections (e.g., wired, wireless, etc.).

Mobile device 105 may send/receive data traffic from/at one or more applications executing at mobile device 105. The applications may include various types of applications, such as, for example, VoIP applications, email applications, web browsing applications, instant messaging (IM) applications, etc. The traffic from the different types of applications may be sent/received via Virtual Private Networks (VPNs) set-up by docking station 110, as described with respect to FIG. 1B below.

Figure 1B:
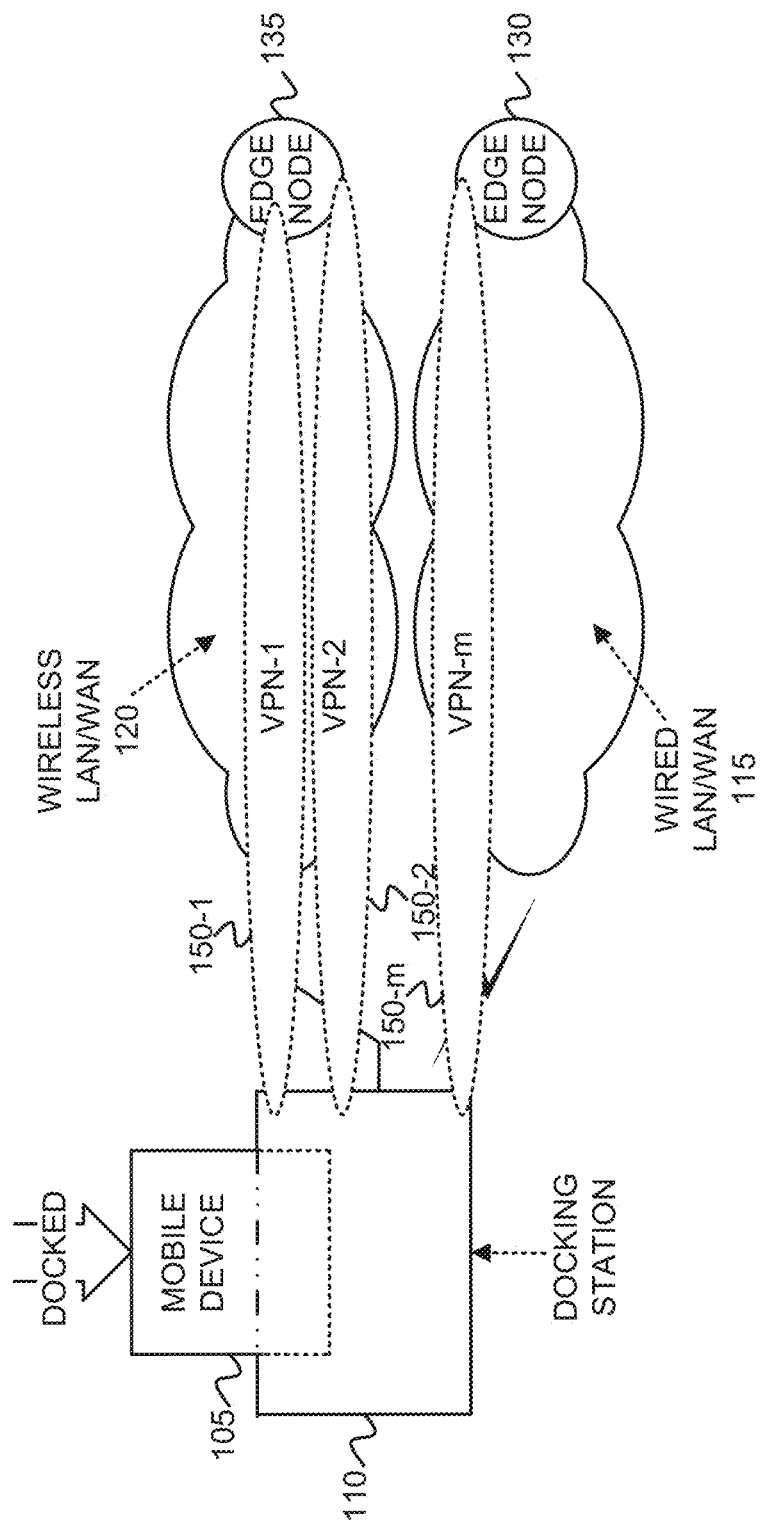
FIG. 1B is a diagram that depicts a simplified view of the network environment of FIG. 1A in which two networks are depicted as carrying traffic to/from docking station 110 and mobile device 105 via different Virtual Private Networks.

FIG. 1B depicts a view of network environment 100 of FIG. 1A in which only two networks—wireless LAN/WAN 120 and wired LAN/WAN 115—are depicted, for the sake of simplicity, as carrying traffic to/from docking station 110 and mobile device 105 via different VPNs. Docking station 110 may set-up multiple different VPNs 150-1 through 150-m that mobile device 105 may use for sending/receiving data traffic via different networks (e.g., wireless LAN/WAN 120 and wired LAN/WAN 115 shown by way of example). Docking station 110 may obtain and assign one or more IP addresses for each of VPNs 150-1 through 150-m, and may assign different types of application types to each of the IP addresses. Therefore, each of VPNs 150-1 through 150-m may carry traffic from specific, different types of applications that are routed via the IP addresses assigned to each of VPNs 150-1 through 150-m. For example, VPN-1 150-1 may carry VoIP traffic, VPN-2 150-2 may carry web browsing traffic, and VPN-m 150-m may carry email traffic. In one exemplary implementation, certain application types may send traffic via the default, public network without being sent via a VPN.

Figure 2A:
FIGS. 2A and 2B are diagrams that depict an exemplary docking station in which a mobile device may be docked.
Figure 2B:

FIGS. 2A and 2B depict an example of a physical configuration of docking station 110, mobile device 105, and a mobile device tray 200, and the physical interconnection of docking station 110, mobile device 105, and mobile device tray 200. Mobile device tray 200 may include a physical configuration that fits the external configuration of mobile device 105, such that mobile device 105 may be inserted into mobile device tray 200. In addition, mobile device 105's Universal Serial Bus (USB) port (or other connector ports) may interconnect with an appropriate physical and electrical port on mobile device tray 200. Subsequent to insertion of mobile device 105 into mobile device tray 200, tray 200 may be inserted into a docking port 210 of docking station 110 to complete the USB port interconnection between mobile device 105 and docking station 110. FIG. 2B depicts mobile phone 105 inserted into docking port 210 of docking station 110. While docked in docking station 110, mobile device 105 may be used for controlling the operation of docking station 110. For example, if mobile device 105 has a touch panel display, then the touch panel display may be used for dialing or initiating a VoIP call, instead of using a keypad on docking station 110.

Figure 3:
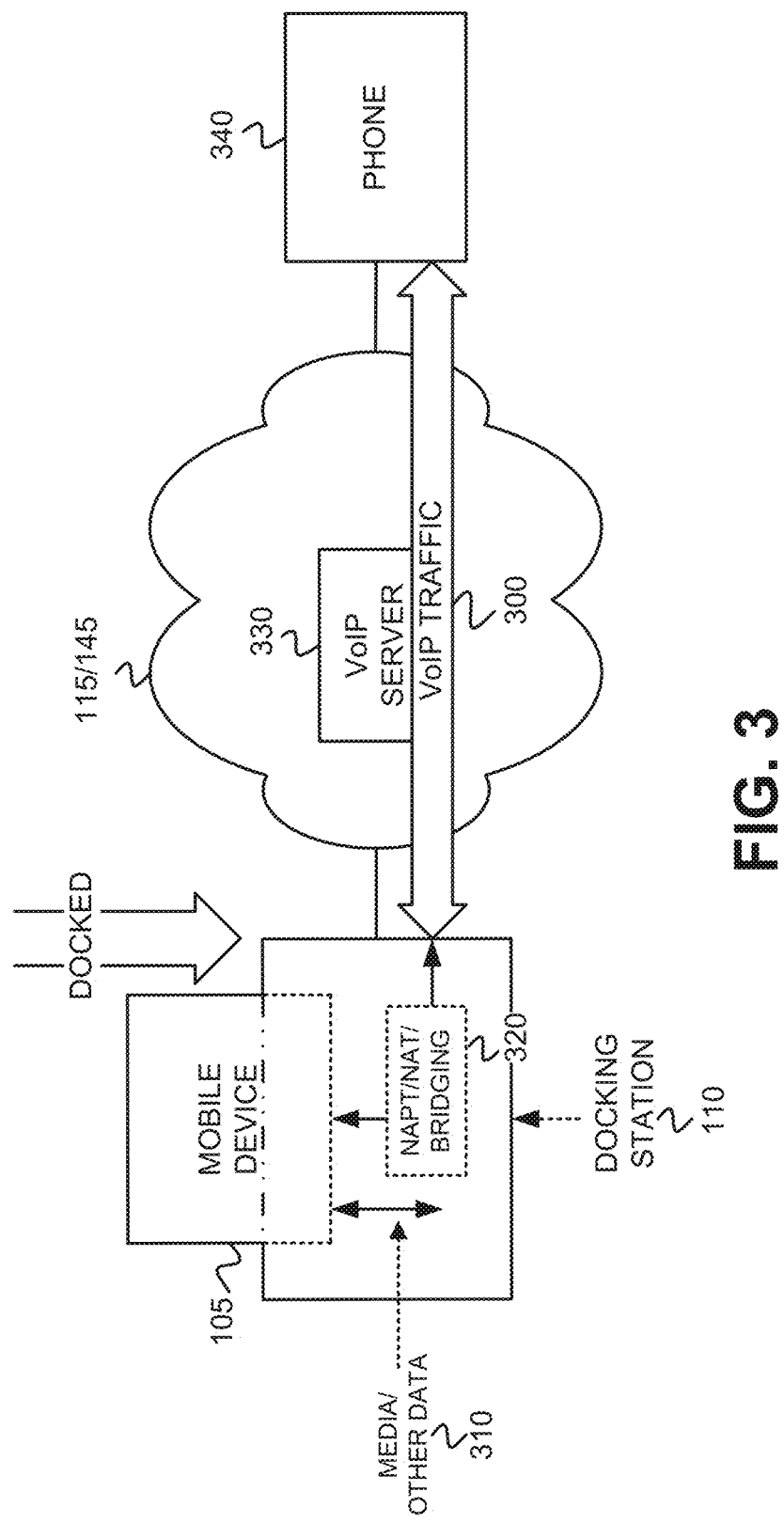
FIG. 3 is a diagram that depicts the exemplary docking station of FIG. 1A enabling a VoIP connection between a docked mobile device and an external network.

FIG. 3 depicts an exemplary embodiment in which mobile device 105 is docked with docking station 110, and mobile device 105 sends a call using VoIP traffic 300 via wired LAN/WAN 115 and network 145. As shown in FIG. 3, mobile device 105 may be docked (i.e., physically inserted into a docking port) with docking station 110. Upon being docked with docking station 110, mobile device 105 may exchange media (e.g., audio or video) or other data 310 with docking station 110. The exchanged media 310 may include audio streamed from a microphone of docking station 110 to mobile device 105, or from a microphone of mobile device 105 to docking station 110. The exchanged media may further include video streamed from a camera (or memory) of docking station 115 to mobile device 105, or from a camera (or memory) of mobile phone 105 to docking station 110.

As further shown in FIG. 3, docking station 110 may connect to wired LAN/WAN 115 and network 145 for sending and/or receiving VoIP traffic 300 to/from mobile device 105 via a VoIP server 330. Docking station 110 may forward VoIP traffic 300 from network 115/145 to mobile device 105, and from mobile device 105 to network 115/145 via a system 320 that implements Network Address Port Translation (NAPT), Network Address Translation (NAT), or a bridging mode. When implementing NAPT or NAT, system 320 may route packets associated with VoIP traffic 300 to/from mobile device 105. A side of docking station 110 facing network 115/145 may have a public, routable Internet Protocol (IP) address on network 115/145, while a side of docking station 110 facing mobile device 105 may have multiple, statically configured private IP addresses. The routable IP address of docking station 110 facing network 115/145 may be statically configured, or may be obtained via the Dynamic Host Configuration Protocol (DHCP) from network 115/145. Mobile device 105 may have multiple statically configured private IP addresses (e.g., on a same network as the private IP address of docking station 110). Mobile device 105 may use the routable IP address of docking station 110 as a default gateway for sending VoIP packets to a phone 340 via network 115/145 and VoIP server 330. A physical and layer 2 connection between docking station 110 and mobile device 105 may include Ethernet over Universal Serial Bus (USB) (e.g., Ethernet frames encapsulated in USB packets). Media 310 may be streamed from one of the multiple private IP addresses associated with mobile device 105 to the IP address associated with docking station 110, or may be streamed in the reverse direction.

When implementing the bridging mode, system 320 may forward packets, at layer 2, from network 115/145, though docking station 110, to mobile device 105. Additionally, system 320 may forward packets, at layer 2, from mobile device 105, though docking station 110, to network 115/145. Docking station 100 may have an IP address, routable in network 115/145, and mobile device 105 may also have a different IP address that is routable in network 115/145. System 320, implementing the bridging mode, may forward packets received at docking station 110 from network 115/145 to the routable IP addresses of mobile device 105. Additionally, when implementing the bridging mode, system 320 may forward packets, received from mobile device 105 at the routable IP address of docking station 110, to network 115/145.

Figure 4:
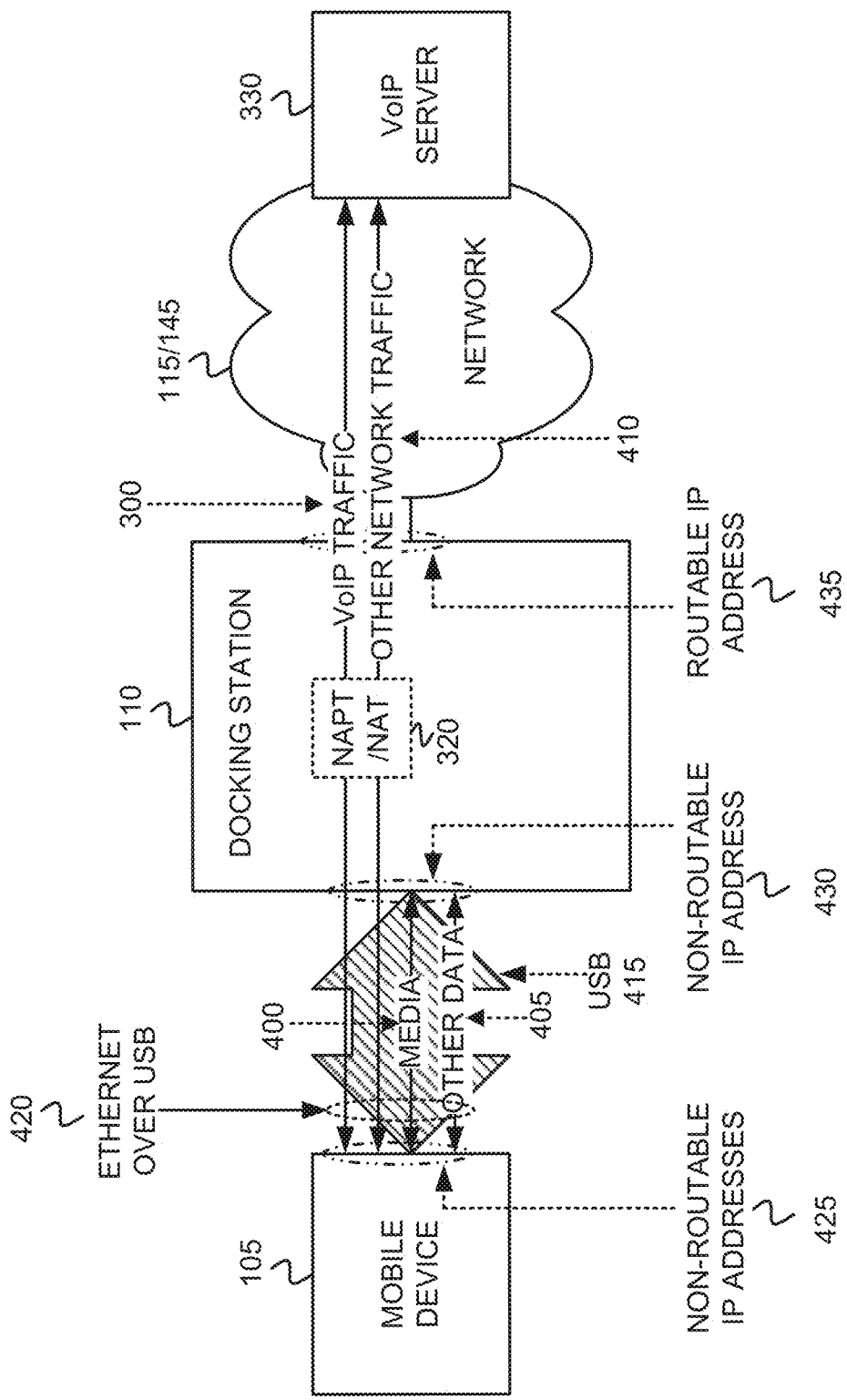
FIG. 4 is a diagram that depicts an exemplary implementation of the docking station of FIG. 1A in which the docking station implements Network Address and Port Translation or Network Address Translation for establishing a VoIP connection between a mobile device and an external network.

FIG. 4 is a diagram that depicts an exemplary implementation of docking station 110 of FIG. 1A in which docking station 110 implements NAPT or NAT for establishing a VoIP connection between mobile device 105 and network 115/145. When mobile device 105 is docked into docking station 110, as shown in FIG. 1A, media 400, other data 405, VoIP traffic 300 and other network traffic 410 may be sent to and from mobile device 105 via a Universal Serial Bus (USB) 415, as further shown in FIG. 4. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 4, mobile device 105 may have statically configured IP addresses 425 that are non-routable from network 115/145 (but routable between IP address 430 of docking station 110 and IP addresses 425 of mobile device 105). As further shown in FIG. 4, docking station 110 may also have a statically configured IP address 430 that is non-routable from network 115/145 (but routable between IP address 430 of docking station 110 and IP address 425 of mobile device 105), where IP address 430 resides on a same private network (not shown) on which IP addresses 425 of mobile device 105 reside. A private network (not shown in FIG. 4), therefore, exists between mobile device 105 and docking station 110 via USB 415.

As further shown in FIG. 4, docking station 110 may have an IP address 435 that is routable from network 115/145. Routable IP address 435 may be statically configured, or may be obtained via the DHCP protocol from network 115/145. Docking station 110 may, therefore, act as a DHCP server to mobile device 105, thereby obtaining routable IP address 435 that may be used by network 115/145 to forward VoIP traffic 300 and other network traffic 410 to mobile device 105 via NAPT/NAT system 320. Non-routable, private IP addresses 425 on mobile device 105 and non-routable, private IP address 430 on docking station 110 may be statically configured prior to the connection of mobile device 105 to docking station 110 via USB 415. By having a routable IP address 435 on network 115/145, a network administrator may manage docking station 110 including, for example, providing software upgrades, firewall management, etc. The ability to address docking station 110 from network 115/145 may not be available when docking station 110 acts as an IP bridge (e.g., the exemplary bridging implementation of FIG. 5).

Media 400 may include audio or video data (e.g., streaming audio or video) that may be streamed from mobile device 105 for playback on docking station 110, or that may be streamed from docking station 110 for playback on mobile device 105. Media 400 may be streamed from mobile device 105 IP addresses 425 to docking station IP address 430, or from docking station IP address 430 to mobile device 105 IP addresses 425. Other data 405 may include keypad information (e.g., indications of keypad presses on docking station 110), status information (e.g., voicemail message indicator light, etc.), and other information that may be exchanged between mobile phone IP addresses 425 and docking station 110 IP address 430. Other data 405 may further include data other than audio or video data, such as, for example, web traffic data. The transfer of media 400 and/or other data 405 may be through sockets, such as Transmission Control Protocol (TCP) or User Datagram Protocol (UDP) sockets.

VoIP traffic 300 may include VoIP signaling traffic (e.g., Session Initiation Protocol (SIP) traffic) and VoIP media traffic (e.g., Real-time Transport Protocol (RTP) or RTP Control Protocol (RTCP)) and may be forwarded through docking station 110 via NAPT/NAT system 320. NAPT/NAT system 320 may implement a forwarding table that forwards packets to/from mobile device 105 through docking station 110 to routable network 115/145. For VoIP applications, the forwarding table may be configured to pass SIP and RTP or RTCP traffic to/from mobile device 105 to routable network 115/145. Additionally, other network traffic 410 may be forwarded to/from mobile device 105 through docking station 110 to routable network 115/145 by the forwarding table based on NAPT or NAT filtering. Other network traffic 410 may include Internet traffic (e.g., web browsing), etc. NAPT/NAT system 320 may receive packets from IP addresses 425 of mobile device 105 sent to routable IP address 435 of docking station 110, and may forward the packets, using the forwarding table, to an appropriate next hop IP address in network 115/145 (e.g., to a next hop switch). NAPT/NAT system 320 may further receive packets from an IP address in network 115/145 sent to routable IP address 435, and may forward the packets, using the forwarding table, to non-routable IP addresses 425 of mobile device 105. A network administrator of network 115/145 may designate what kinds of traffic are permissible, and the forwarding table at docking station 110 may be configured appropriately (e.g., e-mail and web browsing may be forwarded whereas other undesirable traffic may be blocked during the forwarding process). A forwarding table implemented at mobile device 105 may use routable IP address 435 of docking station 110 as the default gateway address for all outgoing packets.

Figure 5:
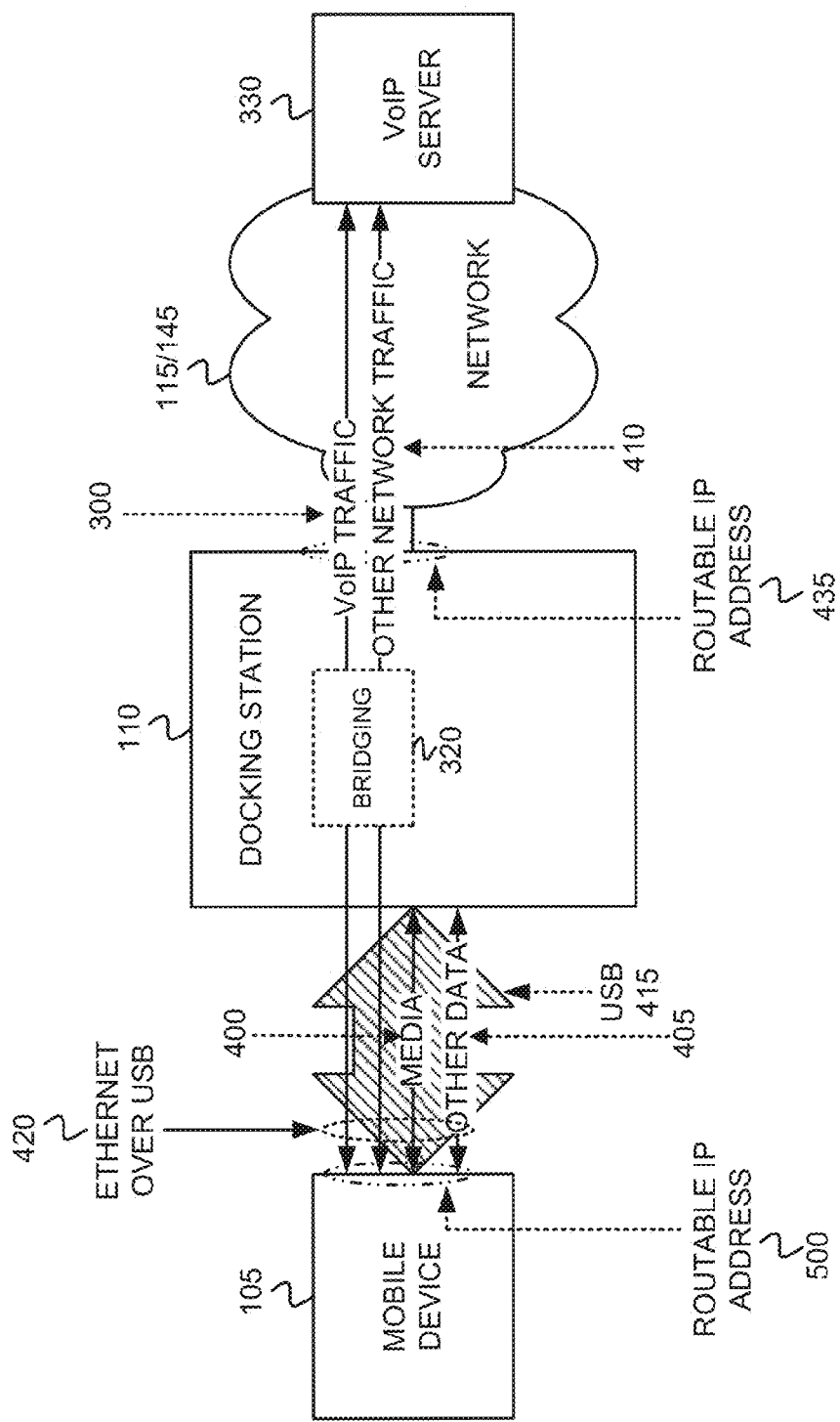
FIG. 5 is a diagram that depicts an exemplary implementation of the docking station of FIG. 1A in which the docking station implements a bridging mode for establishing a VoIP connection between the mobile device and an external network.

FIG. 5 is a diagram that depicts an exemplary implementation of docking station 110 of FIG. 1 in which docking station 110 implements a bridging mode for establishing a VoIP connection between mobile device 105 and network 115/145. When mobile phone 105 is docked into docking station 110, as shown in FIG. 1, media 400, other data 405, VoIP traffic 300 and other network traffic 410 may be sent to and from mobile device 105 via a Universal Serial Bus (USB) 415, as further shown in FIG. 5. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 5, mobile device 105 may have multiple IP addresses 500 that are routable from network 115/145. As further shown in FIG. 5, docking station 110 may also have a IP address 435 that is routable from network 115/145. Routable IP addresses 500 and 435 may be statically configured, or may be obtained via the DHCP protocol from network 115/145. Docking station 110 may, therefore, act as a DHCP server to mobile phone 105, thereby obtaining routable IP addresses 500 and 435 that may be used by network 115/145 to forward VoIP traffic 300 and other network traffic 410 to mobile device 105 via bridging system 320.

Media 400 may be streamed from mobile device 105 for playback on docking station 110, or may be streamed from docking station 110 for playback on mobile device 105. Media 400 may be streamed from mobile device 105 IP addresses 500 to docking station IP address 435, or from docking station IP address 435 to mobile device 105 IP addresses 500. Other data 405 may include keypad information, status information, and other information that may be exchanged between mobile device IP address 500 and docking station 110 IP address 435.

VoIP traffic 300 may include VoIP signaling traffic (e.g., SIP traffic) and VoIP media traffic (e.g., RTP or RTCP) and may be forwarded through docking station 110 via bridging system 320. Bridging system 320 may forward, at layer 2, packets to/from mobile device 105 through docking station 110 to routable network 115/145. Bridging system 320 may "transparently" forward packets, without any NAPT or NAT filtering as performed in the implementation of FIG. 4, from mobile device 105 to network 115/145 and from network 115/145 to mobile device 105. For example, if network 115 includes an Ethernet Local Area Network (LAN), bridging system 320 may forward Ethernet frames from network 115/145 to mobile device 105 based on MAC addresses contained in the Ethernet frames.

Figure 6:
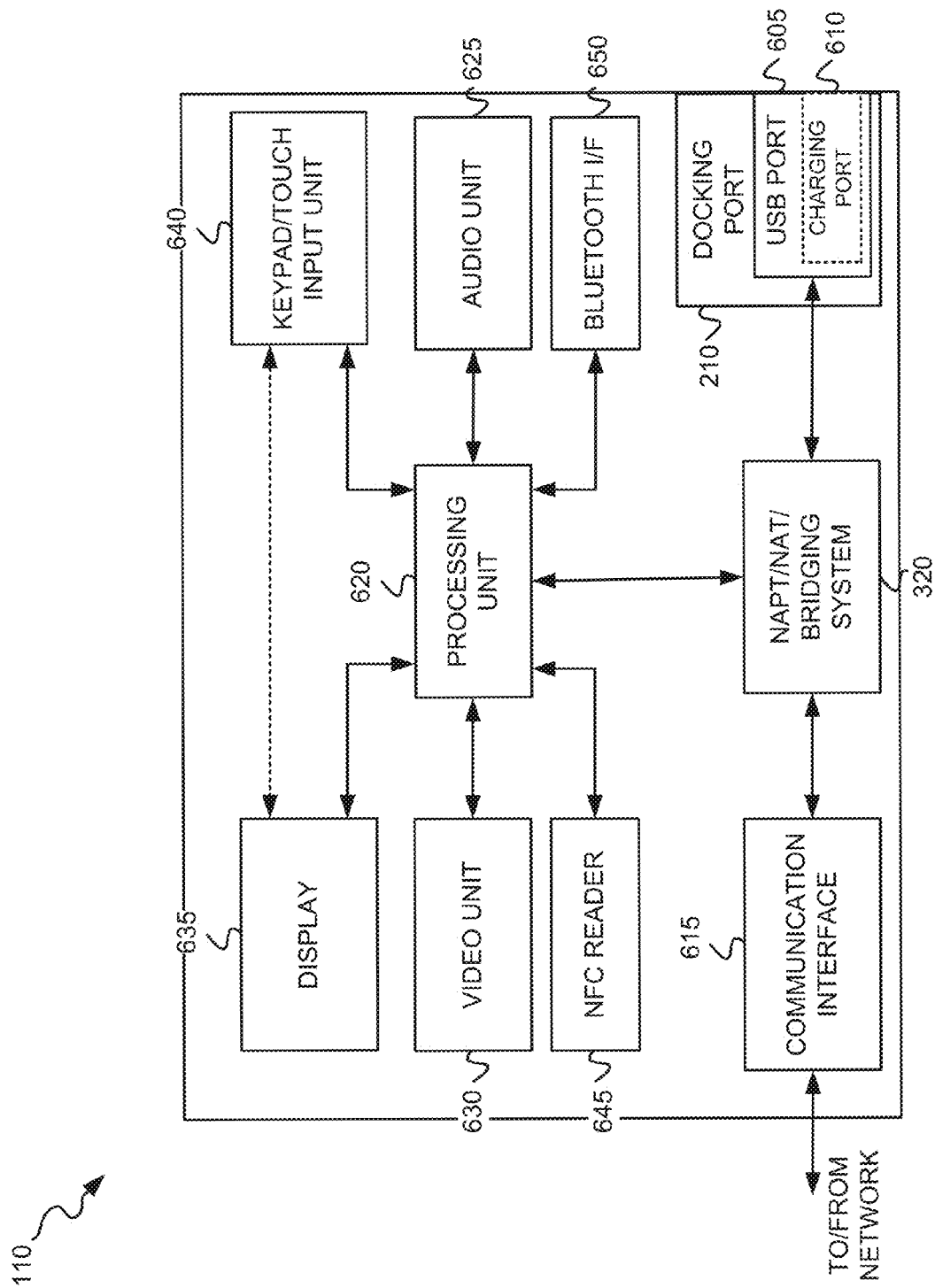
FIG. 6 is a diagram that depicts exemplary components of the docking station of FIG. 1A.

FIG. 6 is a diagram that depicts exemplary components of docking station 110. Docking station 110 may include docking port 210, NAPT/NAT/Bridging system 320, a communication interface 615, a processing unit 620, an audio unit 625, a video unit 630, a display 635, a keypad/touch input 640, a Near Field Communication (NFC) reader 645, and a Bluetooth interface 650.

Docking port 210 may include a port that may physically engage with a tray into which mobile device 105 is inserted. The shape and size of docking port 210 may be different based on a different external configuration of mobile device 105. Docking port 210 may further include a USB port 605, which also includes a charging port 610 (i.e., USB port 605 may simultaneously act as a data port and a battery charging port). Though a single USB port 605 is depicted in FIG. 6, docking station 110 may include multiple USB ports (not shown) and/or a USB hub. Charging port 605 may include an electrical connection for supplying a charging current to a battery of mobile device 105. USB port 610 may include an electrical connection for the USB that may interconnect docking station 110 with mobile device 105 (e.g., via mobile device tray 200).

NAPT/NAT/bridging system 320 may include, in one exemplary implementation that corresponds to FIG. 4 above, a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 320, when implementing NAPT or NAT, may be used to firewall and control traffic sent to mobile device 105 via docking station 110, thus, enhancing the security of, and control over, traffic carried by the docked mobile device 105. NAPT/NAT/bridging system 320 may include, in another exemplary implementation that corresponds to FIG. 5 above, a SOC that implements a bridging mode which may forward packets, at layer 2, from network 115/145, though docking station 110, to mobile device 105. Additionally, the SOC implementing the bridging mode may forward packets, at layer 2, from mobile device 105, though docking station 110, to network 115/145.

Communication interface 615 may include a transceiver for communicating with network 115/145. Processing unit 620 may include a processor, microprocessor, or processing logic that may interpret and execute instructions. The instructions may be stored in memory (not shown), such as, for example, a random access memory (RAM), a Read Only Memory (ROM), or another type of dynamic or static storage device that may store information and instructions for execution by processing unit 620.

Audio unit 625 may include a microphone for receiving audio input into docking station 110, and may include mechanisms for playback of audio data received from the microphone, or received from mobile device 105. Video unit 630 may include a camera for capturing video, and may further include mechanisms for playback of video data received from the camera, or received from mobile device 105. Display 635 may include a display device that may display video data or other types of data associated with the operation of docking station 110 or mobile device 105. In some implementations, display 630 may include a touch screen display that registers touch input at different locations upon the touch screen. Keypad/touch input unit 640 may include an alphanumeric keypad and mechanisms for receiving indications of touch input from display 630.

NFC reader 645 may include a short range, high frequency system that enables the short range (e.g., 10 cm) exchange of data with mobile device 105. When mobile device 105 is placed in proximity to docking station 110 (e.g., device 105 is inserted into docking port 210), NFC reader 645 may "read" phone identity information from a corresponding NFC system located in device 105. In addition to phone identity information, NFC reader 645 may also read phone user identity information from the corresponding NFC system located in device 105. NFC reader 645 may, thus, be used to identify different phones that may be placed in proximity to docking station 110. Bluetooth interface 650 may include a short wavelength system for connecting with, and exchanging data over short distances, with any type of Bluetooth enabled device. Bluetooth interface 650 may, for example, connect with a Bluetooth enabled audio headset that permits a wearer to listen to audio from audio unit 625.

The configuration of components of docking station 110 illustrated in FIG. 6 is for illustrative purposes only. Other configurations may be implemented. Therefore, docking station 110 may include additional, fewer and/or different components than those depicted in FIG. 6. For example, docking station 110 may include a system(s) for implementing an Ethernet switch (not shown in FIG. 6), and/or for implementing Virtual Local Area Networks (VLANs). Docking station 110 may further include a magnetic sensor that may detect the insertion of mobile device 105 into docking port 210 and may thereby initiate various functions at docking station 110 or at mobile device 105 (e.g., initiate execution of a VoIP application at mobile device 105, etc.).

Figure 7:
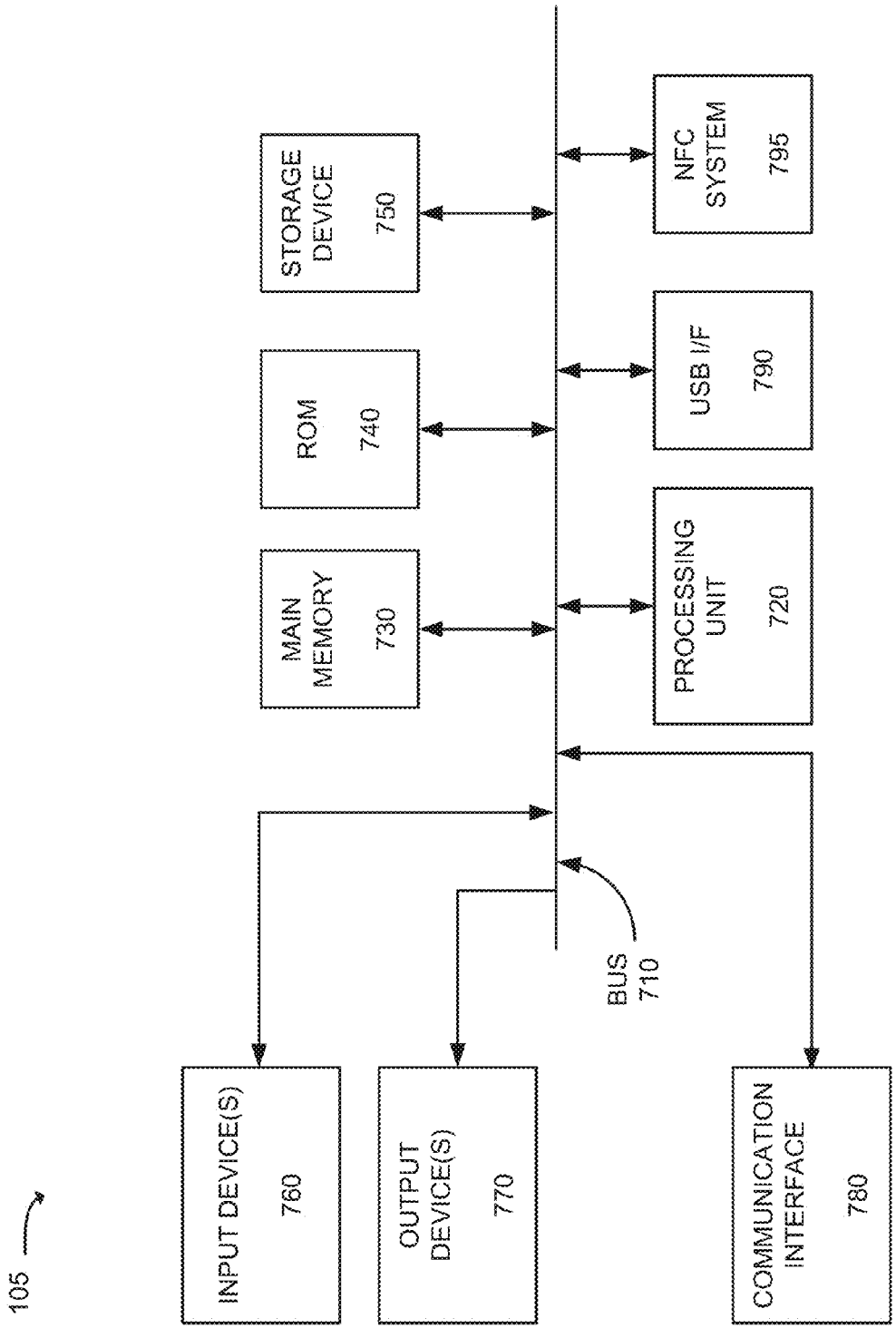
FIG. 7 is a diagram that depicts exemplary components of the mobile device of FIG. 1A.

FIG. 7 is a diagram that depicts exemplary components of mobile device 105. Mobile device 105 may include a bus 710, a processing unit 720, a main memory 730, a read only memory (ROM) 740, a storage device 750, an input device(s) 760, an output device(s) 770, a communication interface 780, a USB interface 790, and a NFC system 795. Bus 710 may include a path that permits communication among the elements of mobile device 105.

Processing unit 720 may include a processor, microprocessor, or processing logic that may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium.

Input device 760 may include one or more mechanisms that permit an operator to input information to mobile device 105, such as, for example, a keypad or a keyboard, voice recognition and/or biometric mechanisms, etc. Output device 770 may include one or more mechanisms that output information to the operator, including a display, a speaker, etc. Communication interface 780 may include any transceiver mechanism that enables mobile device 105 to communicate with other devices and/or systems. For example, communication interface 780 may include a radio frequency transceiver for communicating via wireless LAN/WAN 120 or wireless cellular data network 125. USB I/F 790 may include interconnection mechanisms to permit mobile device 105 to physically and electrically connect with USB port 605 of docking station 110. NFC system 795 may include a short range, high frequency system that enables the short range exchange of data with mobile device 105. When mobile device 105 is placed in proximity to docking station 110 (e.g., device 105 is inserted into docking port 210), NFC system 795 may transmit phone identity information and/or phone user identity information that may be "read" by NFC reader 645 of docking station 110.

The configuration of components of mobile device 105 illustrated in FIG. 7 is for illustrative purposes only. Other configurations may be implemented. Therefore, mobile device 105 may include additional, fewer and/or different components than those depicted in FIG. 7. For example, mobile device 105 may include a GPS unit that may be used for determining a location of mobile device 105.

FIG. 8 depicts an exemplary configuration table 800 that may be stored in a memory of docking station 110. Configuration table 800 may include multiple table entries 805, each of which may include a device identifier (ID) field 810, an application (app) type field 815, an IP address field 820, an actual network field 825, a VPN ID field 830 and a security credentials field 835.

Device ID field 810 may store an identifier that uniquely identifies one or more mobile devices. For example, if two different mobile devices 105 have been docked with docking station 110, then device ID field 810 may store a unique device for each of the two different mobile devices in different entries 805 of configuration table 800. App type field 815 may identify a type of an application that may be stored at the mobile device identified by device ID field 810. A mobile device 105 storing multiple different application types may have multiple entries stored in configuration table 800, with each entry having a different application type identified in app type field 815.

IP address field 820 may store a network address, such as, for example, an IP address, through which packets originating from, or destined for, the application type identified in the corresponding app type field 815 of the entry 805 should be routed. Actual network field 825 may identify the actual network through which the packets originating from, or destined for, the application type identified in app type field 815 should be sent. Actual network field 825 may identify, for example, one of wired LAN/WANs 115-1 through 115-n, wireless LAN/WAN 120, or wireless cellular data network 125. VPN ID field 830 may uniquely identify a VPN through with packets originating from, or destined for, the application type identified in app type field 815 should be sent. Security credentials field 835 may store the security credentials used by mobile device 105 and docking station 110 for accessing a respective VPN. The security credentials stored in field 835 may be split into two parts (e.g., secure_cred_part 1, secure_cred_part 2), with a first part of the security credentials being the credentials distributed to mobile device 105 and the second part of the security credentials being maintained at docking station 110 for VPN access. For example, a user of mobile device 105 may have a unique ID (e.g., a corporate ID number assigned to the user) and an x digit PIN code. The unique ID and PIN code may represent a first portion of the security credentials that may be stored in field 835 table 800 (e.g., as secure_cred_part 1) and distributed to mobile device 105 for storage in VPN table 900 for use in VPN access. Field 835 in table 800 may further store a key or number for the user of mobile device 105. The key or number may be generated by a key or number generator (e.g., a random number generator) for use in accessing one or more VPNs by the user. Thus, for VPN access, the mobile device 105 and docking station 110 may use the unique ID, the PIN code, and the generated key or number.

Upon docking of mobile device 105 into docking station 110, docking station 110 may provide or update the security credentials stored at mobile device 105. For example, upon docking of mobile device 105, docking station 110 may distribute the unique ID and/or PIN code to mobile device 105. In other implementations, the user of mobile device 105 may have to know the unique ID and/or PIN code, and docking station 110 may only store the generated key or number. Since at least a portion of the security credentials remains stored in docking station 110, a loss of a given mobile device 105 may not result in the loss of all of the security credentials. The complexity of the security credentials stored at docking station 110 may vary based on a location of a given docking station 110. For example, a bit length of the security credentials stored at a docking station 110 in a very secure research lab may be longer than the bit length of security credentials stored at a docking station 110 at an office administrator's desk.

Figure 9:
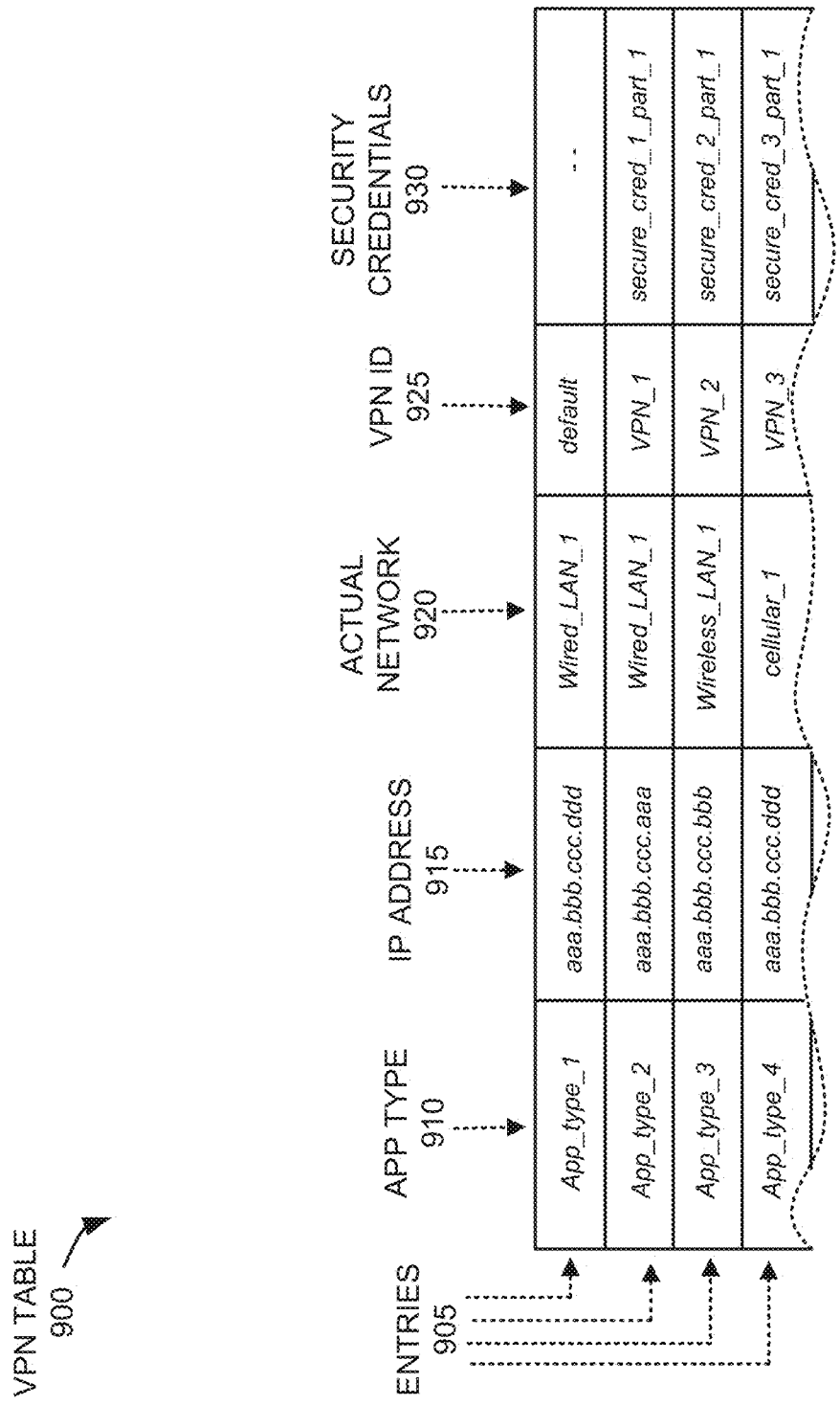
FIG. 9 is a diagram that illustrates an exemplary Virtual Private Network table that may be stored at the mobile device of FIG. 1A.

FIG. 9 depicts an exemplary VPN table 900 that may be stored in a memory of mobile device 105. For example, VPN table 900 may be stored in main memory 730 of mobile device 105. VPN table 900 may include multiple table entries 905, each of which may include an app type field 910, an IP address field 915, an actual network field 920, a VPN ID field 925, and a security credentials field 930. The data stored in the fields of the various entries 905 of VPN table 900 may be obtained from configuration data received from docking station 110.

App type field 910 may identify a type of an application that may be stored at the mobile device storing VPN table 900. For example, a given mobile device 105 may have three different applications installed at mobile device 105, and three different entries 905 may be stored in VPN table 900, with each entry 905 having a different application type identified in app type field 910. IP address field 915 may store a network address, such as, for example, an IP address, through which packets originating from, or destined for, the application type identified in the corresponding app type field 910 of the entry 905 should be routed.

Actual network field 920 may identify the actual network through which the packets originating from, or destined for, the application type identified in app type field 910 should be sent. Actual network field 920 may identify, for example, one of wired LAN/WANs 115-1 through 115-n, wireless LAN/WAN 120, or wireless cellular data network 125. VPN ID field 925 may uniquely identify a VPN through with packets originating from, or destined for, the application type identified in app type field 910 should be sent. Security credentials field 930 may store one or more credentials that may be used, in conjunction with other security credentials stored at docking station 110, to access a VPN. In one exemplary implementation, security credentials field 930 may store a unique ID associated with the user of mobile device 105 and an x digit PIN code. The security credentials stored in field 930 may be distributed to mobile device 105 from docking station 110.

Figure 10:
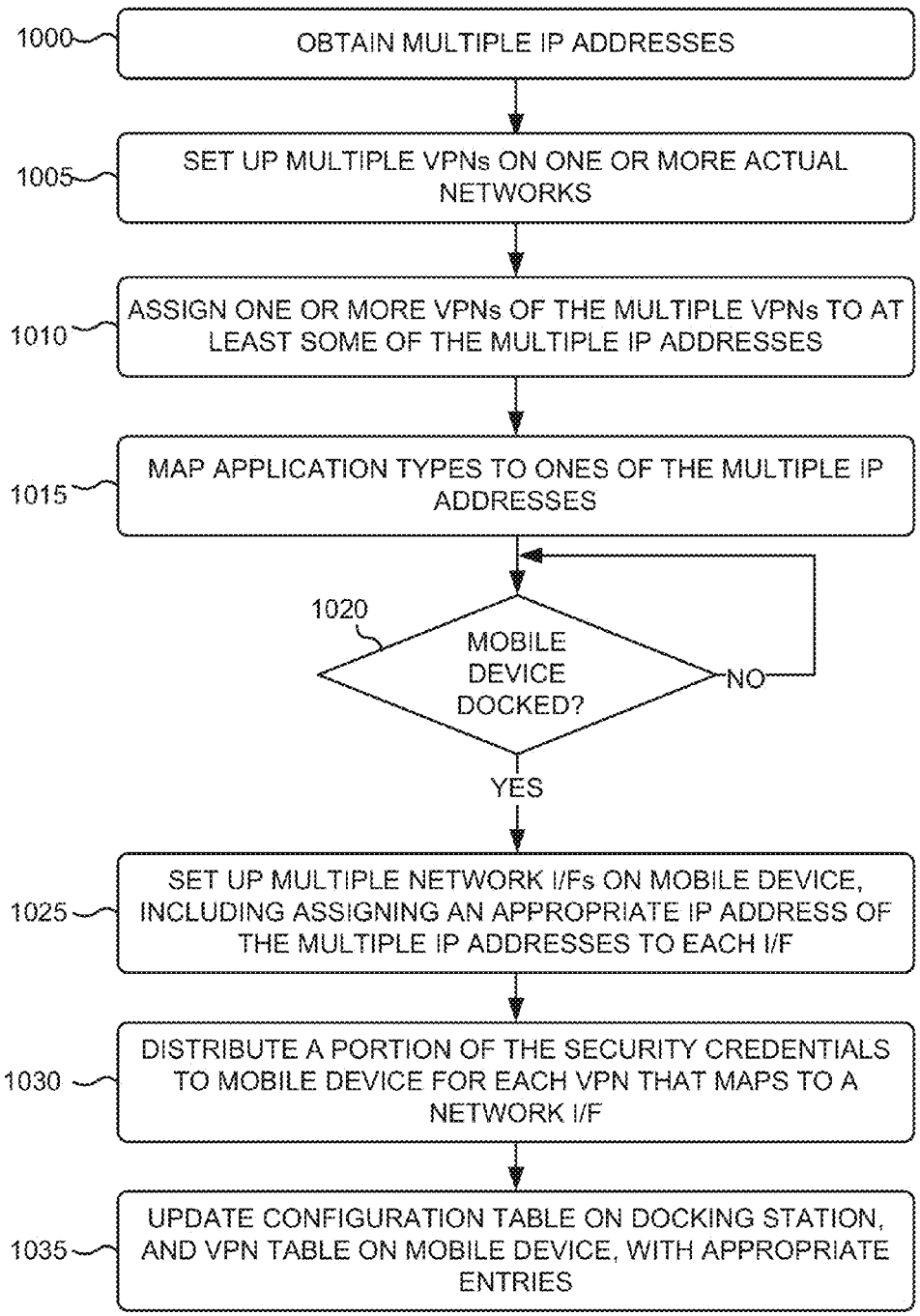
FIG. 10 is a flow diagram that illustrates an exemplary process for mapping network addresses and application types to VPNs, setting up network interfaces on the mobile device of FIG. 1, and also updating configuration information on the mobile device based on the mapped network addresses, application types, and VPNs.

FIG. 10 is a flow diagram that illustrates an exemplary process for mapping network addresses and mobile device application types to VPNs, setting up network interfaces on mobile device 105, and updating configuration information on mobile device 105 from docking station 110 based on the mapped network addresses, application types, and VPNs. The exemplary process of FIG. 10 may be implemented by docking station 110.

Figure 11:
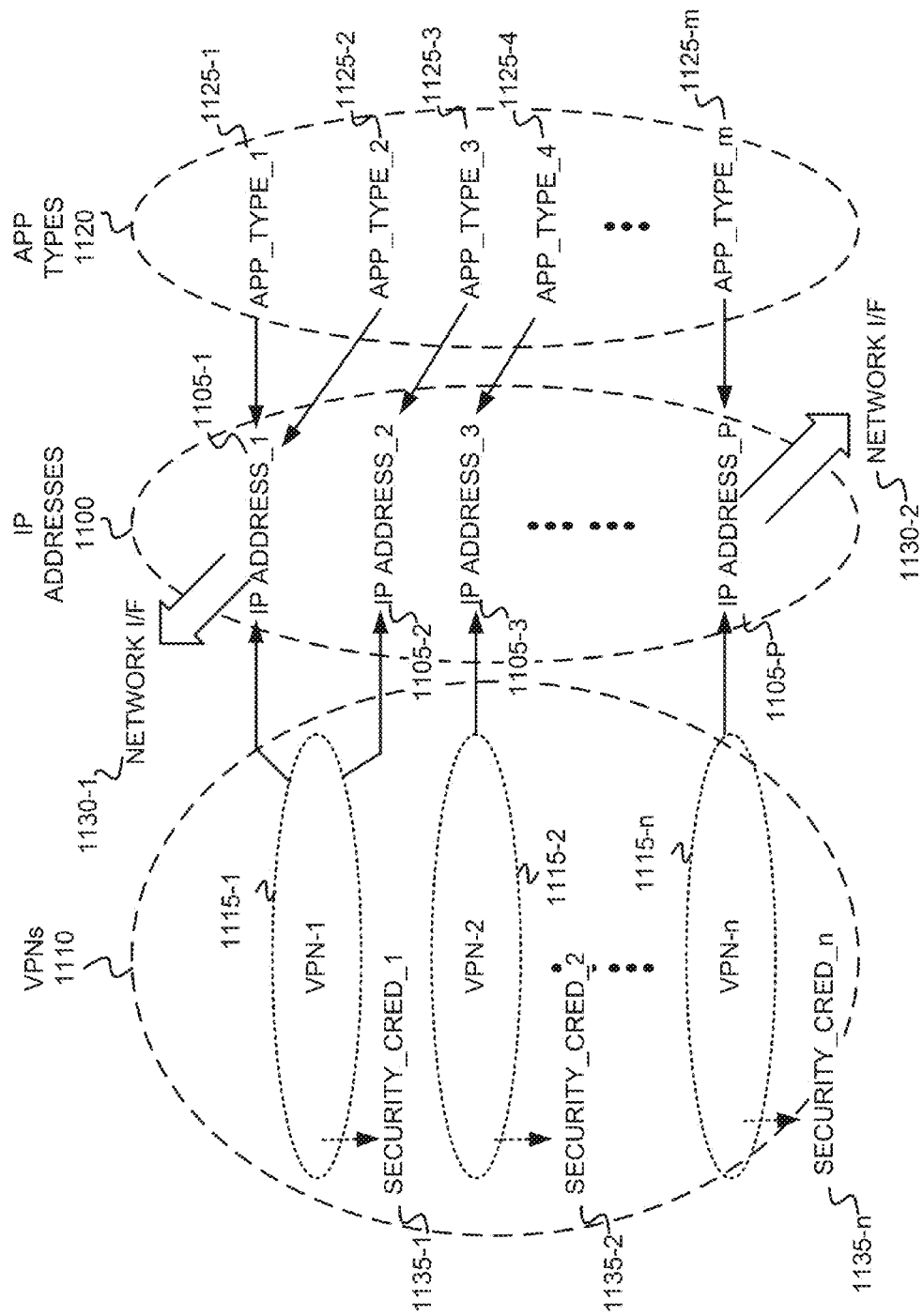
FIG. 11 is a diagram that graphically depicts a mapping between Internet Protocol addresses, application types, and Virtual Private Networks.

The exemplary process may include obtaining multiple addresses (block 1000). The multiple addresses may be statically configured, or may be obtained by docking station 110 via the Dynamic Host Configuration Protocol (DHCP). FIG. 11 depicts a set of multiple 1100 IP addresses obtained by docking station 110. As shown, multiple IP addresses 1100 may include IP addresses 1105-1 through 1105-P, where P may include any integer greater than one.

Docking station 110 may set-up multiple VPNs on one or more actual networks (block 1005). Docking station 110 may use existing techniques for establishing multiple VPNs over wired LANs/WANs 115-1 through 115-n, wireless LAN/WAN 120, and/or wireless cellular data network 125. For example, docking station 110 may establish two VPNs over wired LAN/WAN 115-1, one VPN over wireless LAN/WAN 120, and one VPN over wireless cellular data network 125. Docking station 110 may assign one or more VPNs of the multiple VPNs to at least some of the multiple IP addresses (block 1010). Docking station 110 may selectively assign certain ones of the multiple VPNs 1110 to selected ones of the IP addresses from multiple IP addresses 1100. For example, as shown in FIG. 11, VPN-1 1115-1 may be assigned to IP addresses 1105-1 and 1105-2. VPN-2 115-2 may be assigned to IP address 1105-3, and VPN-n 1115-n may be assigned to IP address 1105-P.

Docking station 110 may map application types to ones of the multiple IP addresses (block 1015). Each application type of client applications that may be installed at mobile device 105 (or at other mobile devices that may be docked into docking station 110) may be mapped to one of the IP addresses of the multiple IP addresses 1100. For example, as shown in FIG. 11, multiple application types 1120 may each be mapped to an IP address of multiple IP addresses 1100. In the example depicted in FIG. 11, app_type_1 1125-1 and app_type_2 1125-2 are each mapped to IP address 1105-1. app_type_3 1125-3 is depicted in FIG. 11 as being mapped to IP address 1105-2, and app_type_4 1125-4 is depicted as being mapped to IP address 1105-3. As further shown in FIG. 11, app_type_m 1125-m is mapped to IP address 1105-P. After the mapping of each application type to an IP address, as shown in FIG. 11, and given that each IP address is assigned to a VPN of multiple VPNs 1110, then each application type is effectively mapped to a VPN. For example, as shown in FIG. 11, app_type_1 1125-1 is mapped to IP address 1105-1, which is further assigned to VPN-1 1115-1. Therefore, when an application having app_type_1 1125-1 sends/receives traffic at mobile device 105, the traffic may be sent/received at IP address 1105-1 via VPN-1 1115-1.

Figure 12:
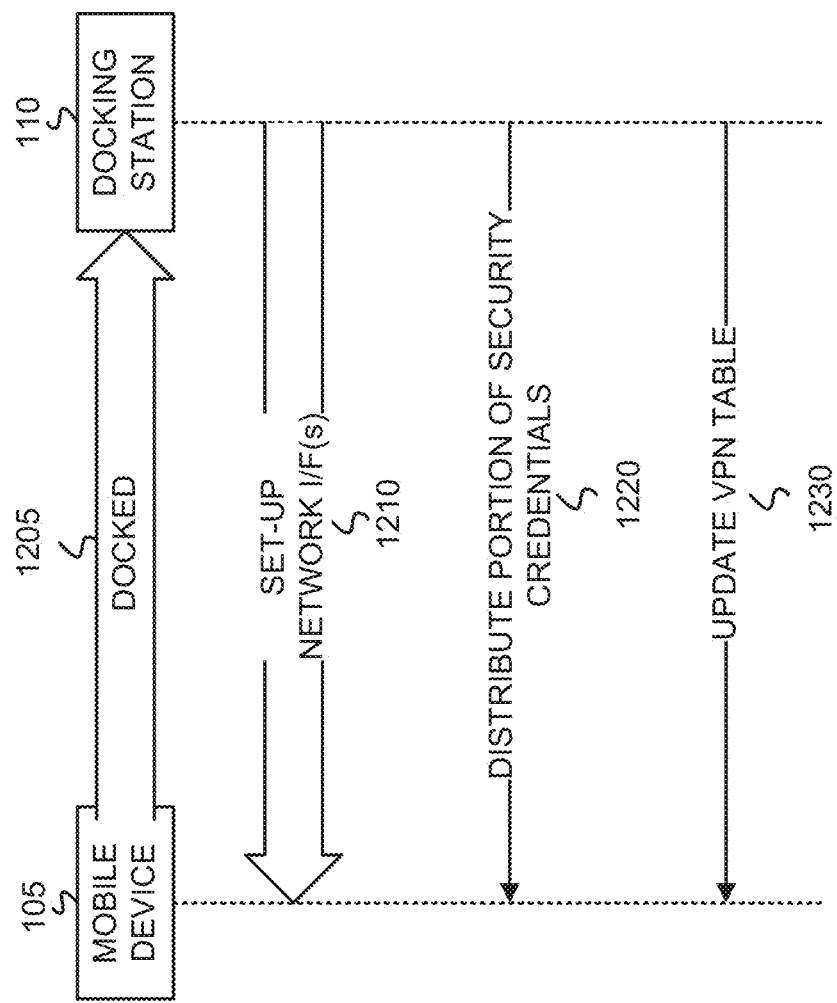
FIG. 12 is a diagram that depicts exemplary messaging associated with the exemplary process of FIG. 10.

Docking station 110 may determine if mobile device 105 has been docked with docking station 110 (block 1020). Docking station 110 may identify if mobile device 105 has been docked with docking port 210 such that USB I/F 790 connects with USB port 605. FIG. 12 depicts mobile device 105 being docked 1205 with docking station 110. If mobile device 105 has been docked with docking station (YES—block 1020), then docking station 110 may set-up multiple network interfaces (I/Fs) on mobile device 105, including assigning an appropriate IP address of the multiple IP addresses to each interface (block 1025). Docking station 110 may identify mobile device 105 (e.g., via a mobile device identifier) and may retrieve data in IP address fields 820 of each entry 805 of table 800 having data in device ID field 810 that matches the mobile device identifier. Each different IP address retrieved from an IP address field 820 may be assigned to a different network interface of mobile device 105. FIG. 12 depicts docking station 110 setting-up 1210 network I/F(s) on mobile device 105.

Docking station 110 may distribute a portion of the security credentials stored in field 835 of table 800 to mobile device 105 for each VPN that maps to a network I/F (block 1030). Docking station 110 may retrieve the portion of the security credentials (e.g., secure_cred_part_1) from field 835 of each entry 805 in table 800 having data in device ID field 810 that matches the mobile device 105's identifier FIG. 11 shows security credentials 1135-1 through 1135-n being associated with respective VPNs 1115-1 through 1115-n. FIG. 12 further depicts docking station 110 distributing 1220 a portion of the security credentials to mobile device 105. Docking station 110 may update configuration table 800 and VPN table 900 with appropriate entries in the various fields (block 1035). Docking station 110 may update entries 805 in configuration table 800, and entries 905 in VPN table 900, with appropriate data obtained in blocks 1000, 1005, 1010, 1015, 1025 and 1030. FIG. 12 depicts docking station 110 updating VPN table 900 of mobile device 105.

Figure 13:
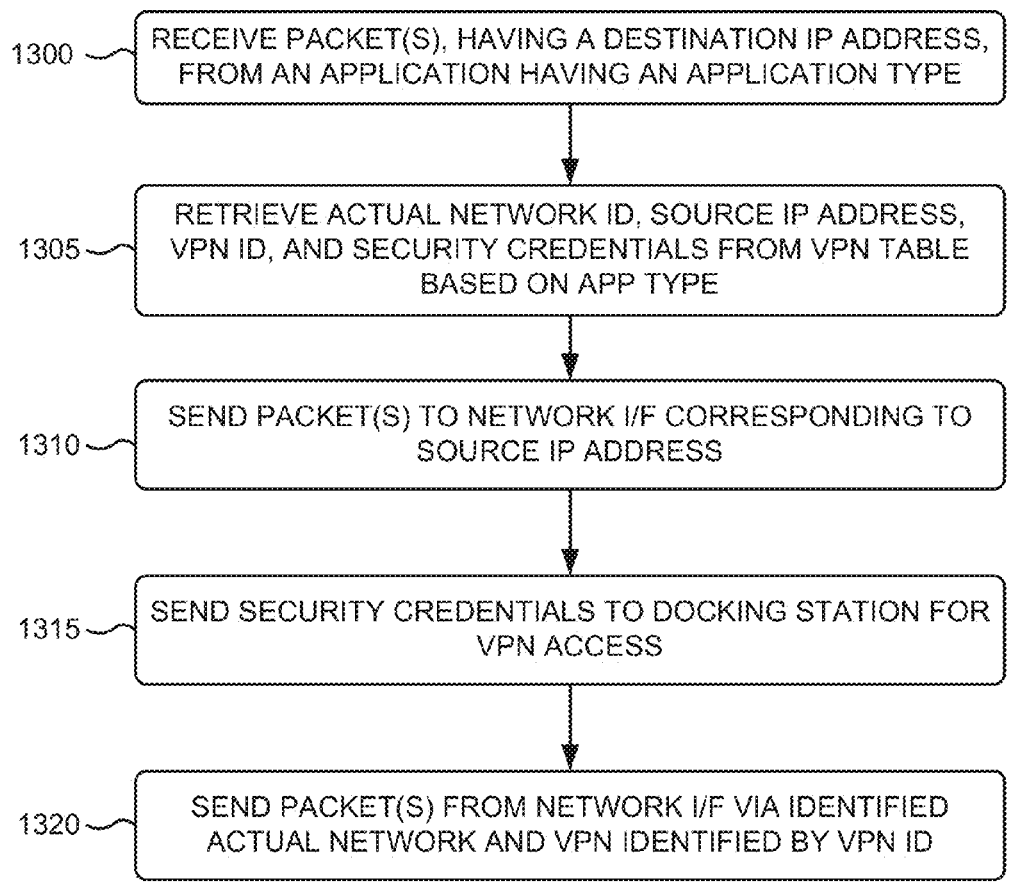
FIG. 13 is a flow diagram that illustrates an exemplary process for sending packets originating from an application having an application type via a network address and VPN corresponding to the application type.

FIG. 13 is a flow diagram that illustrates an exemplary process for sending packets originating from an application having an application type via a network address and VPN corresponding to the application type. The exemplary process of FIG. 13 may be implemented by mobile device 105.

The exemplary process may include receiving a packet(s), having a destination IP address, from an application having an application type (block 1300). An application having a certain application type (e.g., a VoIP application, an email application, a web browsing application, etc.) being executed at mobile device 105 may generate one or more packets for sending to a destination IP address.

An actual network ID, source IP address, VPN ID and security credentials may be retrieved from VPN table 900 based on the application type of the application generating the packet(s) (block 1305). For example, if the application type is "app_type_2," then the actual network, source IP address, VPN ID, and security credentials may be retrieved from fields 920, 915, 925, and 930 of an entry having application type field 910 that matches "app_type_2."

The packet(s) may be sent to a network interface corresponding to the source IP address (block 1310). Each network interface may have an IP address assigned to it. Therefore, the packet may be sent to the network interface retrieved from IP address field 915 of VPN table 900. The security credentials retrieved in block 1305 may be sent to docking station 110 for VPN access (block 1315). The security credentials may be sent to docking station 110, for example, at the beginning of a packet session. Docking station 110 may use the security credentials for authenticating the user of mobile device 105 so as to permit VPN access. The packet(s) may be sent from the network interface via the identified actual network and the VPN identified by the retrieved VPN ID (block 1320). For example, if the application sending the packet(s) has an application type "app_type_3," then the packet(s) may be sent via the actual network retrieved from actual network field 920 and the VPN retrieved from VPN ID field 925 of an entry 905 of table 900 having application type field 910 that matches "app_type_3." If packets sent from mobile device 105 are sent via docking station 110 and wired LAN/WAN 115, then docking station 110 may monitor the packets (i.e., inspect the contents of each packet) for Quality of Service (QoS) monitoring, or for other purposes. In some implementations, docking station 110 may obtain, store, and possibly send to a remote location a copy of one or more packets monitored at docking station 110.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 10 and 13, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
   a memory configured to store multiple different types of applications and a data table;
   a wired communication interface configured to connect to a port of a docking station when the device is docked with the docking station; and
   a processing unit configured to:
   receive, via the wired communication interface from the docking station when the device is docked with the docking station, configuration data that sets up multiple network interfaces on the device, assigns multiple different Virtual Private Networks (VPNs), each having a respective VPN identifier, to the multiple network interfaces, and further assigns one of multiple different network addresses to each of the multiple network interfaces,
   store the configuration data in the data table,
   execute a first type of application of the multiple different types of applications,
   receive one or more first packets from the executing first type of application of the multiple different types of applications,
   index the data table with the first type of application to identify a table entry having an application type field that stores an application type that matches the first type of application, wherein the identified table entry includes a first VPN identifier associated with a first VPN of the multiple different VPNs and first security credentials for use in accessing the first VPN identified by the first VPN identifier,
   retrieve, from the identified table entry of the data table, the first VPN identifier associated with the first VPN of the multiple different VPNs and the first security credentials, and
   send, using the retrieved first security credentials, the one or more first packets via the first VPN identified by the first VPN identifier.

2. The device of claim 1, wherein each one of the multiple different types of applications implements a certain function when executed at the device.

3. The device of claim 1, wherein the configuration data stored in the data table:
   maps the first type of application of the multiple different types of applications to a first one of the multiple different network addresses, and
   maps a second type of application of the multiple different types of applications to a second one of the multiple different network addresses.

4. The device of claim 1, wherein the device comprises a digital computing device that is configured to communicate via multiple different types of network connections.

5. The device of claim 4, wherein the device comprises a cellular telephone, a tablet computer, or a personal digital assistant (PDA).

6. The device of claim 1, wherein the processing unit is further configured to:
   retrieve a network identifier and one of the network addresses from the identified table entry of the data table, wherein the network identifier identifies one of a wired local area network (LAN), a wired wide area network (WAN), a wireless LAN, a wireless WAN, or a wireless cellular network.

7. The device of claim 6, wherein the processing unit is further configured to:
   send, using the first security credentials, the one or more first packets via the identified one of the wired LAN, the wired WAN, the wireless LAN, the wireless WAN, or the wireless cellular network over the first VPN identified by the first VPN identifier.

8. The device of claim 1, wherein the wired communication interface comprises a Universal Serial Bus (USB) interface and wherein the USB interface connects to a USB port of a docking station when the device is docked with the docking station.

9. The device of claim 8, wherein the processing unit is further configured to receive the configuration data from the docking station via the USB port of the docking station and via the USB interface of the device.

10. The device of claim 1, wherein the processing unit is further configured to:
    execute a second type of application of the multiple different types of applications,
    receive one or more second packets from the executing second type of application,
    index the data table with the second type of application to identify a second table entry having an application type field that stores an application type that matches the second type of application, wherein the identified second table entry includes a second VPN identifier associated with a second VPN of the multiple different VPNs and second security credentials for use in accessing the second VPN identified by the second VPN identifier,
    retrieve, from the identified second table entry of the data table, the second VPN identifier associated with the second VPN of the multiple different VPNs and the second security credentials, and send, using the retrieved second security credentials, the one or more second packets via the second VPN identified by the second VPN identifier.

11. The device of claim 1, further comprising:
a wireless communication interface;
wherein the processing unit is further configured to:
send the one or more first packets, using the wireless communication interface, via a wireless Local Area Network (LAN) or a wireless cellular network.

12. A method, comprising:
receiving, at a device from a docking station when the device is docked with the docking station, configuration data that sets up multiple network interfaces on the device, assigns multiple different Virtual Private Networks (VPNs), each having a respective VPN identifier, to the multiple network interfaces, and assigns one of multiple different network addresses to each of the multiple network interfaces;
storing, at the device, the configuration data in a data table;
executing a first type of application of multiple types of applications, wherein each one of the multiple types of applications implements a certain function when executed;
receiving one or more first packets from the executing the first type of application of the multiple types of applications;
indexing the data table with the first type of application to identify a table entry having an application type field that stores an application type that matches the first type of application, wherein the identified table entry includes a first VPN identifier associated with a first VPN of the multiple different VPNs and first security credentials for use in accessing the first VPN identified by the first VPN identifier;
retrieving, from the identified table entry of the data table, the first VPN identifier associated with the first VPN of the multiple different VPNs and the first security credentials; and
sending, using the retrieved first security credentials, the one or more first packets via the first VPN identified by the first VPN identifier.

13. The method of claim 12, further comprising:
retrieving a network identifier and one of the network addresses from the identified table entry of the data table, wherein the network identifier identifies one of a wired local area network (LAN), a wired wide area network (WAN), a wireless LAN, a wireless WAN, or a wireless cellular network.

14. The method of claim 13, further comprising:
sending, using the retrieved first security credentials, the one or more first packets via the identified one of the wired LAN, the wired WAN, the wireless LAN, the wireless WAN, or the wireless cellular network over the first VPN identified by the first VPN identifier.

15. The method of claim 12, wherein the device includes a Universal Serial Bus (USB) interface and wherein the USB interface connects to a USB port of the docking station when the device is docked with the docking station, and the method further comprising:
receiving, at the device, the configuration data from the docking station via the USB port of the docking station and via the USB interface of the device.

16. The method of claim 12, further comprising:
executing a second type of application of the multiple types of applications;
receiving one or more second packets from the executing second type of application;
indexing the data table with the second type of application to identify a second table entry having an application type field that stores an application type that matches the second type of application, wherein the identified second table entry includes a second VPN identifier associated with a second VPN of the multiple different VPNs and second security credentials for use in accessing the second VPN identified by the second VPN identifier,
retrieving, from the identified second table entry of the data table, the second VPN identifier associated with the second VPN of the multiple different VPNs and the second security credentials; and
sending, using the retrieved second security credentials, the one or more second packets via the second VPN identified by the second VPN identifier.

17. A device, comprising:
a memory configured to store multiple types of applications;
a wired communication interface configured to connect to a port of a docking station when the device is docked with the docking station; and
a processing unit configured to:
receive, via the wired communication interface from the docking station when the device is docked with the docking station, configuration data that sets up multiple network interfaces on the device, and assigns multiple different virtual private networks (VPNs), each having a respective VPN identifier, to the multiple network interfaces,
store the configuration data in the memory,
execute a first type of application of multiple types of applications,
identify a first VPN of the multiple different VPNs based on the first type of application and the stored configuration data,
retrieve, from the configured data stored in the memory based on the first type of application, first security credentials associated with the first VPN,
send, using the first security credentials, one or more first packets generated by the first type of application via the identified first VPN of the multiple different VPNs,
execute a second type of application of the multiple types of applications,
identify a second VPN of the multiple different VPNs based on the second type of application and the stored configuration data,
retrieve, from the configuration data stored in the memory based on the second type of application, second security credentials associated with the second VPN, and
send, using the second security credentials, one or more second packets generated by the second type of application via the identified second VPN of the multiple different VPNs.

18. The device of claim 17, wherein the configuration data further assigns one of multiple different network addresses to each of the multiple network interfaces and wherein the processing unit is further configured to:
retrieve, from the configuration data stored in the memory based on the first type of application, a first network identifier and a first one of the multiple different network addresses, wherein the first network identifier identifies one of a wired local area network (LAN), a wired wide area network (WAN), a wireless LAN, a wireless WAN, or a wireless cellular network, and send, using the first security credentials, the one or more first packets via the identified one of the wired LAN, the wired WAN, the wireless LAN, the wireless WAN, or the wireless cellular network over the first VPN identified by the first VPN identifier.

19. The device of claim 18, wherein the configuration data further assigns one of multiple different network addresses to each of the multiple network interfaces and wherein the processing unit is further configured to:
retrieve, from the configuration data stored in the memory based on the second type of application, a second network identifier and a second one of the multiple different network addresses, wherein the second network identifier identifies one of the wired LAN, the wired WAN, the wireless LAN, the wireless WAN, or the wireless cellular network, and
send, using the second security credentials, the one or more second packets via the identified one of the wired LAN, the wired WAN, the wireless LAN, the wireless WAN, or the wireless cellular network over the second VPN identified by the second VPN identifier.

20. The device of claim 17, wherein the configuration data stored in the memory:
maps the first type of application of the multiple different types of applications to a first one of the multiple different network addresses, the first VPN of the multiple different VPNs, and the first security credentials associated with the first VPN, and
maps a second type of application of the multiple different types of applications to a second one of the multiple different network addresses, the second VPN of the multiple different VPNs, and the second security credentials associated with the second VPN.

* * * * *